United States Patent
Kern et al.

(10) Patent No.: US 10,962,057 B2
(45) Date of Patent: *Mar. 30, 2021

(54) ROLLING-ELEMENT BEARING UNIT FOR A MOTOR VEHICLE WHEEL OR A MOTORBIKE ROCKER ARM

(71) Applicant: Aktiebolaget SKF, Gothenburg (SE)

(72) Inventors: Henning Kern, Dittelbrunn (DE); Michael Emmert, Willmars (DE); Tom Schmitz, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,271

(22) Filed: Sep. 18, 2019

(65) Prior Publication Data
US 2020/0096044 A1 Mar. 26, 2020

(30) Foreign Application Priority Data
Sep. 26, 2018 (DE) ...................... 10 2018 216 496.7

(51) Int. Cl.
*F16C 33/66* (2006.01)
*B60B 27/00* (2006.01)

(52) U.S. Cl.
CPC ........ *F16C 33/6648* (2013.01); *B60B 27/001* (2013.01)

(58) Field of Classification Search
CPC .......... F16C 19/08; F16C 19/18; F16C 19/54; F16C 19/542; F16C 19/547; F16C 33/44; F16C 33/6648; F16C 33/6651; F16C 33/3837; F16C 33/3862; F16C 33/3843; F16C 33/41
See application file for complete search history.

(56) References Cited

U.S. PATENT DOCUMENTS 1,996,841 A * 4/1935 Stevens ............... F16C 33/3831
384/527
4,406,504 A * 9/1983 Coenen .................. B62K 19/34
384/458
(Continued)

FOREIGN PATENT DOCUMENTS

DE 102013210523 A1 12/2014
DE 202016103442 U1 7/2016
(Continued)

OTHER PUBLICATIONS

Search Report and Written Opinion from the European Patent Office dated Dec. 20, 2019 in related EP application No. 19 198 840.1, and partial translation thereof.

*Primary Examiner* — James Pilkington
(74) *Attorney, Agent, or Firm* — J-Tek Law PLLC; Scott T. Wakeman; Mark A. Ussai

(57) ABSTRACT

A rolling-element bearing unit for use in a motor vehicle wheel or in a motorbike rocker arm includes outer and inner raceway elements and a set of rolling elements between the inner and outer raceway elements such that the inner and outer raceway elements are pivotable or rotatable relative to each other and also a lubricant reservoir body in the bearing interior for storing and dispensing a lubricant, the body including bridge elements extending between adjacent pairs of the rolling elements and a side ring connecting the bridge elements.

14 Claims, 1 Drawing Sheet

(56) References Cited

U.S. PATENT DOCUMENTS

| | | | | |
|---|---|---|---|---|
| 5,918,986 | A * | 7/1999 | Matsui | A61C 1/05 384/470 |
| 5,984,528 | A * | 11/1999 | Ohtsu | B60B 27/0078 384/458 |
| 6,228,813 | B1 * | 5/2001 | Yabe | C08L 23/06 384/463 |
| 6,485,184 | B1 * | 11/2002 | Adachi | F16C 33/7843 384/463 |
| 10,436,253 | B2 * | 10/2019 | Michael | B62K 21/06 |
| 2014/0363114 | A1 | 12/2014 | Katsaros | |
| 2019/0257359 | A1 * | 8/2019 | Michael | B62M 3/003 |

FOREIGN PATENT DOCUMENTS

| | | |
|---|---|---|
| JP | 2008215418 A | 9/2008 |
| JP | 2008215419 A | 9/2008 |

\* cited by examiner

ROLLING-ELEMENT BEARING UNIT FOR A MOTOR VEHICLE WHEEL OR A MOTORBIKE ROCKER ARM

CROSS-REFERENCE

This application claims priority to German patent application no. 10 2018 216 496.7 filed on Sep. 26, 2018, the contents of which are fully incorporated herein by reference.

TECHNOLOGICAL FIELD

The disclosure is directed to a rolling-element bearing unit for a motor vehicle wheel or motorbike rocker arm.

BACKGROUND

Rolling elements for motor vehicle wheels are found, for example, in automobiles, in particular configured as double row angular contact ball bearings; in vans and trucks, in particular configured as double row tapered roller bearings; in off-road and special vehicles, in motorbikes, in particular configured as single row deep groove ball bearings, in (electro-) scooters, in quads, in snowmobiles with respect to the wheels which cooperate with the chains, and so on. Depending on the field of use, these bearing assemblies are subjected to more or less heavy loads that originate from the environment, but also from the vehicle itself, and these loads influence the rolling-element bearing service life. The same applies to rolling-element bearing units for motorbike rocker arms.

SUMMARY

It is therefore an aspect of the present disclosure to provide a rolling-element bearing unit for a motor vehicle wheel or a motorbike rocker arm that has an improved service life.

According to the disclosure, a rolling-element bearing unit for a motor vehicle wheel or a motorbike rocker arm comprises the following features:
  an outer raceway element,
  an inner raceway element,
  a set of rolling elements disposed between the raceway elements such that the raceway elements are at least pivotable against each other in the manner of a rolling-element bearing, and
  a lubricant reservoir, shaped at least as a prong cage, for storing and dispensing a lubricant, with bridge elements extending between the rolling elements and a side ring connecting the bridge elements.

Depending on usage, but also strongly varying again with the respective field of use, these rolling-element bearing assemblies are subjected to more or less strong environmental influences like dust, moisture, up to massive liquid influences, mud, and so on, but also to influences originating from the motor such as, for example, vibrations that occur while the bearing is supporting the significant weight of the vehicle. Compared to a comparable grease-lubricated rolling-element bearing assembly, the lubricant reservoir replaces the lubricant, so to speak, fills virtually the entire free interior of the rolling-element bearing assembly, and encloses, in particular completely, the rolling elements and their cages. Due to the nearly complete filling, two to four times more lubricating oil is thus available in the rolling-element bearing assembly compared to comparable grease-lubricated rolling-element bearing assemblies, wherein due to the lubricant reservoir a uniform distribution of lubricating oil is simultaneously also ensured with further advantage, which together significantly increases the service life of the rolling-element bearing assembly in particular with the above-mentioned loads. Here of course there is also advantageously no longer any grease friction.

With the design of the lubricant reservoir as an oil-impregnable polymer matrix, after the introduction of the polymer material into the rolling-element bearing only very narrow intermediate spaces remain around the rolling elements and near the surfaces of the raceway elements. The polymer material has a porous structure with millions of microscopically small pores that retain the oil due to surface tension. During operation of the rolling-element bearing the oil is discharged from the polymer material into the narrow intermediate spaces between it and the bearing parts and thus ensures an efficient minimum-quantity lubrication. An additional protection from the ingress of contaminants into the actual rolled-on region of the rolling-element bearing thereby arises. The narrow osculation between the polymer structure, the rolling elements, and raceways very significantly reduces the penetration of contaminants.

The lubricant reservoir also makes the injection of lubricant particularly advantageously secure from flushing-out. Furthermore, liquids penetrating from outside cannot mix with the oil or polymer material. Lubricant leaks are practically precluded since the polymer matrix retains the oil in the bearing. Seals in the bearing increase the oil dwell time in the rolling-element bearing even more.

The introduction of the polymer matrix of the lubricant reservoir into the rolling-element bearing assembly is effected, for example, in an injection molding process, wherein after the cooling of the injected polymer only a minimal gap remains out to the rolled-on raceways of the raceway elements, the rolling elements, their cages, and so on. The free running of the rolling-element bearing assembly is thereby not impaired. The coefficient of friction and smooth running properties are not negatively influenced. Other feared negative effects due to the use of the lubricant reservoir as a so-called additional to-be-circulated object having mass could also be refuted. Here the lubricating oil is already contained in the polymer base material. An environmentally friendly, high-quality, and/or oxidation-resistant synthetic oil can be used. Due to the almost complete filling of the bearing interior with the lubricant reservoir, water, dirt particles, and similar contaminants effectively cannot enter into the rolling-element bearing assembly. The rolling-element bearing is protected from contamination and premature failure. Since more lubricant is permanently available in the region of the rolling elements and the rolled-on raceways, stoppage damage or damage due to intensive cleaning is also reliably prevented.

In addition, with a corresponding arrangement inside the rolling-element bearing assembly the lubricant reservoir also advantageously supports seals of the rolling-element bearing assembly, wherein this is true independent of whether contacting seals or non-contactingly abutting sealing washers are used. Compared to a conventional bearing assembly equipped with contacting or contactless seals, due to the presence of the lubricant reservoir adjacent to the seals a so-to-speak physical or mechanical supporting arises for the seals so that an inward pressing, for example, due to external loads, and thus a leakage of the seals is reliably prevented. Compared to a conventional rolling-element bearing including contactingly abutting seals the further advantage arises that even after the contactingly abutting seal lips wear out, whereby the contactingly abutting seals "mutate," so to speak, into contactless gap seals, the rolling-element bearing furthermore remains sufficiently protected against external influences due to the lubricant reservoir.

The mentioned supporting of the seals by the lubricant reservoir ensures that even with corresponding pressure from outside, contaminants such as foreign particles and water cannot penetrate into the bearing, in particular toward the rolled-on raceways. Furthermore, a washing-out of the lubricant is additionally prevented and thus the corrosion risk is minimized. This is also true in particular with external cleaning influences on the rolling-element bearing assembly, wherein merely by way of example the cleaning with a high-pressure jet having pressures up 15 bar is mentioned. Chemical reactions, corrosion pits, and crevice corrosion, and peeling and cracks possibly resulting therefrom, which in the worst case can even endanger safety, are thus advantageously prevented; this also applies for rust formation due to the capillary effect of water penetrating into the bearing, in particular with stoppages under moderately ventilated conditions after the cleaning.

Finally, the advantages of the lubricant reservoir body (or insert) are even so far-reaching that conventional solutions including contactingly abutting seals are substitutable with the following advantages, in particular in wheel-bearing assemblies, by solutions including non-contactingly-abutting sealing washers plus lubricant reservoir. Lower friction is thus achievable, whereby in turn higher speeds, lower operating power consumption, and faster accelerations are achievable, which is significant not only for use in public road transport, but also for motor sports. Furthermore there is also an advantage in particular compared to grease-lubricated bearings, since normal grease reaches its performance limits at high speeds, since high speeds usually necessitate higher temperatures of the rolling-element bearing assembly, and, for example, at 10° higher temperatures the grease service life is already halved.

Furthermore, the mentioned lubricant reservoir can also preferably be used when the bearing location is difficult to access, and a re-lubrication is difficult, or when it must withstand aggressive cleaning agents. Due to the presence of the lubricant reservoir the rolling-element bearing is practically maintenance-free, with the result that relubrication is unnecessary. Since due to the relatively large oil reservoir in the bearing the lubricant reservoir contains two to four times more base oil than a bearing having conventional grease lubrication, relubrication can advantageously be omitted completely.

Further advantages of this solution are that the oil always remains at the use point, it does not escape and does not contaminate its environment. The polymer matrix is environmentally compatible and makes possible the same load rating as standard bearings.

Further advantages features and details of the invention result from the exemplary embodiments of the invention described in the following with the assistance of the Figures.

DETAILED DESCRIPTION

Figure 1:
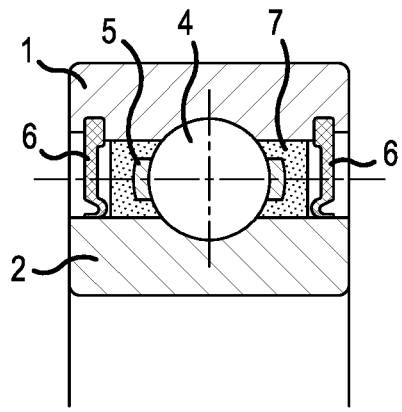
FIGS. 1 and 2 show an upper region of a longitudinal section through a deep groove ball bearing.

FIG. 1 shows the upper region of a longitudinal section through a deep-groove ball bearing as is usable for supporting a motorbike front wheel, a motorbike rear wheel, or a motorbike rocker. The deep groove ball bearing comprises an outer raceway element 1 that is annular in the exemplary embodiment shown here, and is formed, for example, from a through- or case-hardened rolling-element-bearing- or case-hardening-steel. In other embodiments the external raceway element 1 can of course also be configured as an integral component of a housing and/or from other suitable materials. Furthermore the deep groove ball bearing comprises an inner raceway element 2, for which the above description for the outer raceway element 1 correspondingly applies, so that, for example, the inner raceway element 2 can also be an integral component of a shaft. A set of spherical rolling elements 4 is disposed between the raceway elements 1 and 2 while elements are provided for rolling on the rolled-on raceway surfaces of the inner and outer raceway elements 2 and 1, so that via the rolling elements 4 the raceway elements 1 and 2 are pivotable or rotatable against each other in the manner of a rolling-element bearing. Here the balls 4 are formed from the same material as the inner and/or outer raceway element 2 and 1, but they can also be formed from other suitable materials, for example, a ceramic. Here the rolling elements 4 are disposed and optionally held in a cage 5 that prevents a mutual contacting of the rolling elements 4. The cage 5 is formed from a suitable material, for example, a metal alloy or plastic.

The space between the outer and inner raceway elements 1 and 2, which space contains the rolling elements 4, is sealed here from outside in by seals 6 integrated in the rolling-element bearing, wherein the seals 6, configured in a disc-type manner, are retained in the outer raceway element 1, for example, by being snapped into a corresponding groove, and inwardly contactingly abut on the inner raceway element 2 by a seal lip in the manner of a contacting seal. The space remaining near the rolling elements 4 and the cage 5 between the outer and inner raceway element 1 and 2 as well as between the seals 6 is filled by the lubricant reservoir 7 by a proportion of greater than 80%. In other embodiments, also depending on the respective seal design, fillings of greater than 90% up to 95%, 97%, or even close to 100%, are possible.

Here the lubricant reservoir 7 is configured in a window-cage manner, wherein two side rings are connected to a plurality of bridge elements; each bridge element extends between two adjacent balls 4. Here the lubricant reservoir 7 is configured one-piece and of uniform material and is then produced, for example, by injection into the completely assembled deep groove ball bearing, which comprises the raceway elements 1 and 2, the balls 4, and the cage 5, but still before inserting the seals 6. The lubricant reservoir 7 thus encloses the cage 5 and the balls 4 as well as the corresponding surfaces of the raceway element 1 and 2. In other embodiments the lubricant reservoir 7 can of course also be differently produced, for example, prefabricated outside of the bearing. In principle a merely prong-type-cage design of the lubricant reservoir can also be used. Furthermore the side ring or the side rings can also be configured singly or multiply slotted and/or the bridge elements may not extend between all adjacent rolling-element pairings, so that the lubricant reservoir can also be multi-piece or multi-part.

Here the lubricant reservoir 7 is formed from a polymer matrix which can be impregnated with a lubricating oil. In one embodiment the cage 5 can also be omitted so that its space as well as function is filled by the lubricant reservoir 7.

Figure 2:
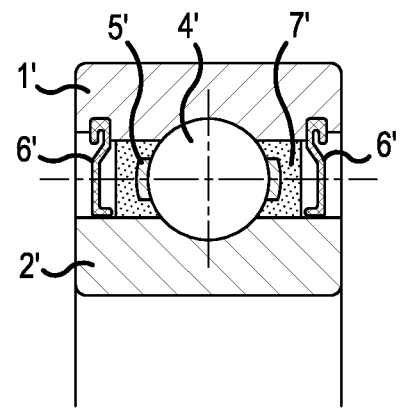

FIG. 2 shows an upper region of a longitudinal section through a further deep groove ball bearing that is usable according to the disclosure for supporting a motorbike front wheel, a motorbike rear wheel, or a motorbike rocker. Here the deep groove ball bearing of FIG. 2 differs from that of FIG. 1 only in that instead of the contact seals being integrated in the bearing, sealing washers 6' forming seal gaps are now used. Otherwise the above description correspondingly applies to the deep groove ball bearing described of FIG. 1, wherein comparable components having the same reference numbers are supplemented by an apostrophe.

In other embodiments the bearings of FIGS. 1 and 2, for example in paired use, can also be configured with only one seal 6 or 6'. In turn in another not-shown embodiment, bearings corresponding to FIGS. 1 and 2 can also be used entirely without seals 6 and 6', which can be useful, for example, if the sealing as such is realized not by seals integrated in the bearing, but rather outside the actual bearing, for example, on conversion parts of the bearing.

Figure 3:
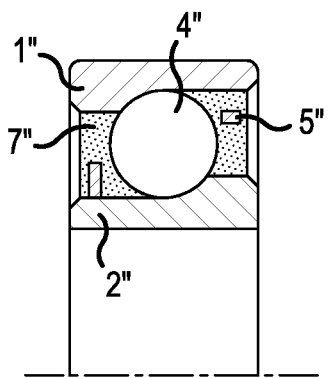
FIG. 3 shows an upper region of a longitudinal section through an angular contact ball bearing.

FIG. 3 shows an upper region of a longitudinal section through an angular contact ball bearing, that is usable according to the disclosure in particular in interaction with a further angular contact ball bearing in face-to-face- or back-to-back arrangement for supporting an automobile wheel. In principle the description above for the bearings of FIGS. 1 and 2 correspondingly applies, so that comparable components having the same reference numbers are supplemented by two apostrophes. In contrast to FIGS. 1 and 2, the angular contact ball bearing of FIG. 3 is configured without seals, so that the percentage values indicated above for space-filling by the lubricant reservoir 7" in the angular contact ball bearing of FIG. 3 apply for the space containing the rolling elements 5", which arises such that, so to speak, in the sense of a wrapping of the two raceway elements 1" and 2" a line is imagined, in particular a straight line, connecting the respective end sides of the raceway elements 1" and 2". With such a design, the sealing is then usually effected without seals in or on the further components surrounding or adjacent to the angular contact ball bearing, which components function as a seal carrier and as countersurface. In other embodiments the angular contact ball bearing of FIG. 3 as described for FIGS. 1 and 2 can of course also be equipped with seals, integrated in the bearing, shown there on both sides, or as also described above, only on one side.

In other embodiments, instead of the depicted deep-groove- and angular-contact-ball bearings, of course other ball bearings, for example, three- or four-point contact ball bearings, but also roller bearings, in particular tapered and cylindrical roller bearings, can be used, and/or also multi-row rolling-element bearings.

Figure 4:
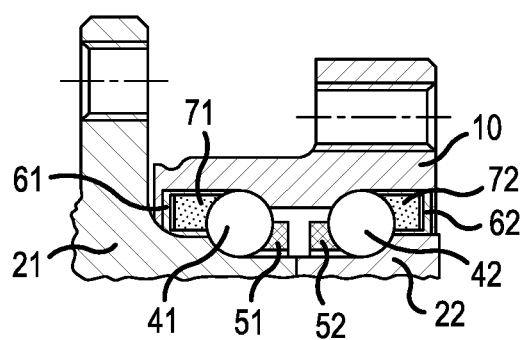
FIG. 4 shows in detail view an upper region of a longitudinal section through a rolling-element bearing assembly of an automobile wheel.

FIG. 4 shows in detail view an upper region of a longitudinal section through a rolling-element bearing assembly of a non-driven automobile wheel. Here the wheel bearing assembly comprises an outer part 10 that is provided for fixedly connecting to the vehicle body and that forms, as an outer raceway element, the two outer rolled-on raceways for the left and right rows of balls 41 and 42 of the double row angular contact ball bearing. Here a first inner part 21 of the wheel bearing assembly forms, as a raceway element, the inner rolled-on raceway for the left row of balls 41. Furthermore, the first inner part 21 is provides a flange on which a wheel rim is provided for screwing thereon. The wheel bearing assembly comprises a second inner part 22 that forms, as a raceway element, the inner rolled-on raceway for the right-hand row of balls 42. Here the first and the second inner parts 21 and 22 are fixedly connected to each other according to one of the known solutions in a not-shown manner. Here the left and the right rows of balls 41 and 42 are each disposed in a known manner in a separate cage 51 and 52.

Sealing washers 61 and 62 are fastened in the non-rotating outer part, which are each configured to form an annular seal gap with the rotatable inner parts 21 and 22. Lubricant reservoirs 71 and 72 are disposed directly adjacent to the sealing washers 61 and 62, or as seen from outside, directly behind the sealing washers 61 and 62. Here a separate lubricant reservoir 71 and 72 is provided for each of the two rows of balls 41 and 42, wherein each of the lubricant reservoirs 71 and 72 is configured prong-type, enclosing the respective row of balls 41 or 42. In particular, the previous explanations with respect to the lubricant reservoirs 7, 7', and 7" of FIGS. 1 to 3 correspondingly apply for the lubricant reservoirs 71 and 72. As already described above, the above-described advantages result with this solution compared to comparable solutions without lubricant reservoir but including contactingly abutting seals.

Of course, in other embodiments the lubricant reservoir is advantageously also usable in wheel bearing assemblies including contactingly abutting seals. Independent of the seal type, the lubricant reservoirs are of course also advantageously usable in wheel bearing assemblies configured as double row tapered roller bearing assemblies, wherein in particular in the truck segment double row tapered roller bearing units having increasing size are used as wheel bearings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearing units for motor vehicle wheels or motorbike rocker arms.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:
1. A rolling-element bearing unit comprising:
an outer raceway element,
an inner raceway element, a set of rolling elements disposed between the inner and outer raceway elements such that the inner and outer raceway elements are pivotable or rotatable relative to each other, and a cage comprising:
  a first cage forming a lubricant reservoir for storing and dispensing a lubricant, the first cage including bridge elements extending between the rolling elements and at least one side ring connecting the bridge elements; and
  a second cage formed from metal or plastic, the first cage at least partially enclosing the second cage, wherein the inner bearing ring and the outer bearing ring define a space containing the plurality of rolling elements and the lubricant reservoir, a first seal acts between the inner bearing ring and the outer bearing ring to seal one side of the space and a second seal acts between the inner bearing ring and the outer bearing ring to seal a second side of the space wherein the first and second seal each, in combination with the lubricant reservoir, define an empty gap which extends from an outer surface of the inner bearing ring to an inner surface of the outer bearing ring, and wherein the cage occupies greater than 80% of the space that is not occupied by the plurality of rolling elements.

2. The rolling-element bearing unit according to claim 1, wherein the first cage has a given clearance from the rolling elements and raceway elements and substantially fills intermediate spaces between the rolling elements.

3. The rolling-element bearing unit according to claim 1, wherein the first cage is porous.

4. The rolling-element bearing unit according to claim 1, wherein the first cage comprises a lubricant impregnatable polymer matrix.

5. The rolling-element bearing unit according to claim 1, wherein the lubricant is a lubricating oil.

6. The rolling-element bearing unit according to claim 1, wherein the first cage comprises a porous polymer matrix impregnated with lubricating oil.

7. The rolling-element bearing unit according to claim 1, wherein the cage is configured as a window-type bearing cage.

8. A rolling-element bearing unit comprising:
an outer raceway element,
an inner raceway element,
a set of rolling elements disposed between the inner and outer raceway elements such that the inner and outer raceway elements are pivotable or rotatable relative to each other, and a cage comprising:
  a first cage forming a lubricant reservoir for storing and dispensing a lubricant, the first cage including bridge elements extending between the rolling elements and at least one side ring connecting the bridge elements, wherein the inner bearing ring and the outer bearing ring define a space containing the plurality of rolling elements and the lubricant reservoir, a first seal acts between the inner bearing ring and the outer bearing ring to seal one side of the space and a second seal acts between the inner bearing ring and the outer bearing ring to seal a second side of the space, and wherein the first cage occupies greater than 80% of the space that is not occupied by the plurality of rolling elements.

9. The rolling-element bearing unit according to claim 8, further comprising a second cage formed from metal or plastic, the first cage at least partially enclosing the second cage, wherein the first cage comprises a window cage.

10. The rolling-element bearing unit according to claim 9, wherein the first and second seal each in combination with the first cage define an empty gap which extends from an outer surface of the inner bearing ring to an inner surface of the outer bearing ring.

11. The rolling-element bearing unit according to claim 8, wherein the first cage occupies greater than 90% and up to 95% of the space that is not occupied by the plurality of rolling elements.

12. The rolling-element bearing unit according to claim 8, wherein the first cage occupies greater than 90% and up to 97% of the space that is not occupied by the plurality of rolling elements.

13. The rolling-element bearing unit according to claim 8, wherein the first cage occupies greater than 80% and up to 95% of the space that is not occupied by the plurality of rolling elements.

14. The rolling-element bearing unit according to claim 8, wherein the first cage occupies greater than 80% and up to 97% of the space that is not occupied by the plurality of rolling elements.

* * * * *